US008868867B2

(12) United States Patent
Swanson et al.

(10) Patent No.: US 8,868,867 B2
(45) Date of Patent: Oct. 21, 2014

(54) METHOD FOR REDUCING LATENCY OF ACCESSING DATA STORED IN A FILE SYSTEM ON A COMPUTER STORAGE DEVICE BY CACHING FILE SYSTEM PERMISSION INFORMATION IN THE COMPUTER STORAGE DEVICE

(75) Inventors: Steven Swanson, San Diego, CA (US); Adrian Caulfield, Oceanside, CA (US); Todor Mollov, Mountain View, CA (US)

(73) Assignee: The Regents of the University of California, Oakland, CA (US)

( * ) Notice: Subject to any disclaimer, the term of this patent is extended or adjusted under 35 U.S.C. 154(b) by 217 days.

(21) Appl. No.: 13/619,303

(22) Filed: Sep. 14, 2012

(65) Prior Publication Data

US 2013/0254477 A1    Sep. 26, 2013

Related U.S. Application Data

(60) Provisional application No. 61/535,243, filed on Sep. 15, 2011.

(51) Int. Cl.
G06F 12/14 (2006.01)
G06F 3/06 (2006.01)
G06F 21/79 (2013.01)

(52) U.S. Cl.
CPC .............. *G06F 3/061* (2013.01); *G06F 3/0689* (2013.01); *G06F 21/79* (2013.01)
USPC .................................. 711/163; 711/E12.093

(58) Field of Classification Search
USPC ............ 711/163, E12.091, E12.093, E12.096
See application file for complete search history.

(56) References Cited

U.S. PATENT DOCUMENTS

| | | | | |
|---|---|---|---|---|
| 5,659,798 | A * | 8/1997 | Blumrich et al. | 710/26 |
| 7,003,586 | B1 * | 2/2006 | Bailey et al. | 709/250 |
| 2007/0067591 | A1 * | 3/2007 | Shiraki et al. | 711/163 |
| 2009/0198932 | A1 * | 8/2009 | Beaver | 711/163 |
| 2009/0216520 | A1 * | 8/2009 | Khan et al. | 703/26 |
| 2010/0262740 | A1 * | 10/2010 | Borchers et al. | 710/263 |
| 2011/0289178 | A1 * | 11/2011 | Ittah et al. | 709/213 |
| 2012/0117348 | A1 * | 5/2012 | Triantafillou et al. | 711/163 |

* cited by examiner

*Primary Examiner* — Hal Schnee
(74) *Attorney, Agent, or Firm* — AlbertDhand LLP

(57) ABSTRACT

Systems and methods of storage device access are provided, where the operating system copies permission and mapping information to the storage array and/or to the application program's memory. The application program can then access the storage device without the operating system's intervention and the storage device will check whether the application has permission to access the data. As a result, in most cases, neither the operating system nor the file system needs to be invoked, and since both of them increase the amount of time required to access the data in the file system, considerable performance improvements are possible.

23 Claims, 7 Drawing Sheets

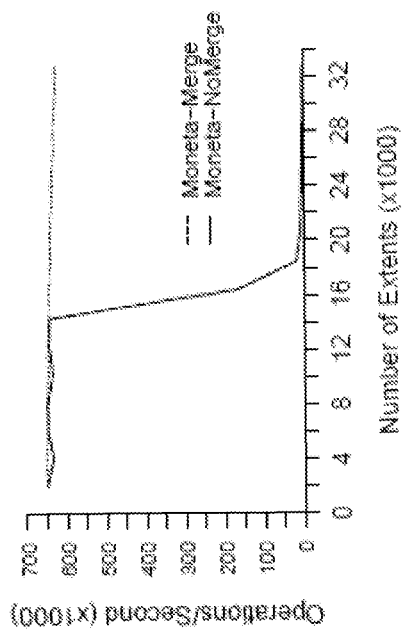
Figure 4
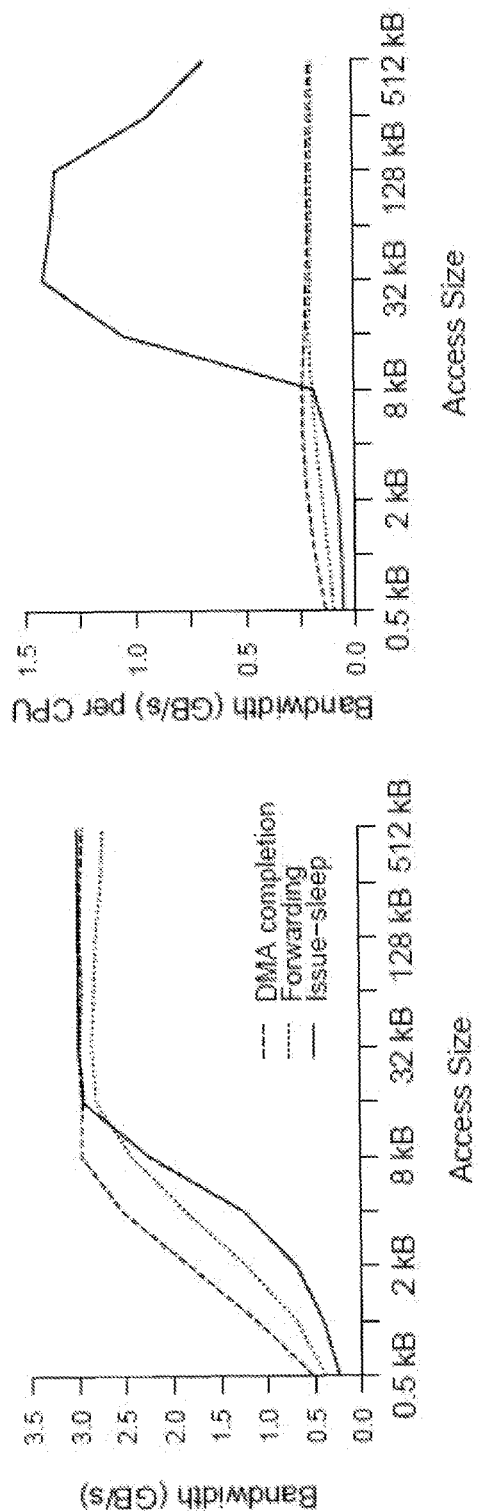
Figure 5a
Figure 5b

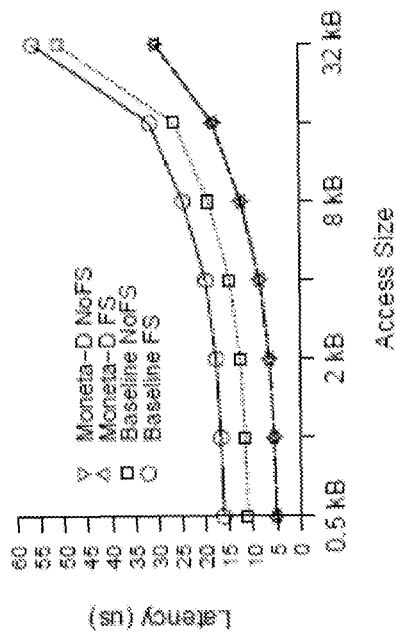
Figure 6
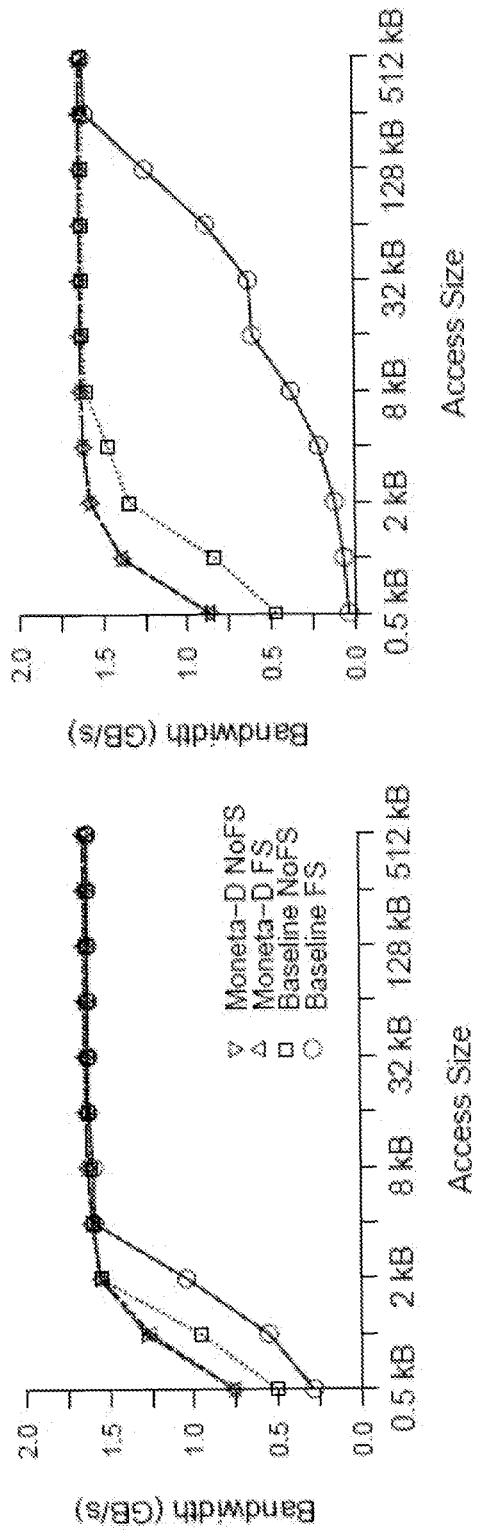
Figure 7a
Figure 7b

METHOD FOR REDUCING LATENCY OF ACCESSING DATA STORED IN A FILE SYSTEM ON A COMPUTER STORAGE DEVICE BY CACHING FILE SYSTEM PERMISSION INFORMATION IN THE COMPUTER STORAGE DEVICE

CROSS-REFERENCE TO RELATED PATENT APPLICATIONS

This application claims priority under 35 U.S.C. §119(e) to U.S. Provisional Patent Application Ser. No. 61/535,243, filed Sep. 15, 2011.

GOVERNMENT LICENSE RIGHTS

This invention was made with government support under the grant number OCI0910847 awarded by the National Science Foundation. The government has certain rights in the invention.

TECHNICAL FIELD

The present invention relates to data storage, and in particular, to providing direct access to computer system storage devices without invoking either the operating system or file system of the computer system.

BACKGROUND

Emerging fast, non-volatile memories (e.g., phase change memories, spin-torque MRAMs, and the memristor) reduce storage access latencies by an order of magnitude compared to state-of-the-art flash-base d solid-state disks/drives (SSDs). These technologies will rewrite the rules governing how storage hardware and software interact to determine overall storage system performance. As a result, software overheads that used to have little impact on storage performance will become critical to fully exploiting the performance that these memories can offer. In particular, software overheads that used to contribute marginally to latency (because storage hardware was slow) will potentially squander the performance that these new memories can provide.

Recent work describing Moneta, a fast, next-generation storage architecture, has shown that optimizing the existing IO stack and tuning the hardware/software interface can reduce software overheads by up to 62% and increase sustained bandwidth for small accesses by up to 19×. However, even with these reduced overheads, IO processing places large demands on a system's compute resources, i.e., sustaining peak performance on Moneta for 4 KB requests requires the dedicated attention of 9 Nehalem thread contexts. Entering the kernel, performing file system checks, and returning to user space account for 30% (8 µs) of the latency for 4 KB requests. Together they also reduce sustained throughput by 85%. However, simply removing those layers is not possible because they provide essential management and protection mechanisms.

SUMMARY

Various embodiments are directed to a next-generation, high-performance storage hardware and software architecture that removes data access overheads experienced with conventional SSDs, and enables improved performance of almost any SSD. In particular, SSDs improved with the architecture contemplated and disclosed herein reduce the cost of accessing data stored in a computer file system by providing an application program with direct access to the storage devices that holds the data. Normally, to access data in a file system, an application makes a call to the operating system which invokes the file system to determine where the data resides in the storage device and whether the application has permission to access it. In contrast, and in accordance with various embodiments, the operating system copies permission and mapping information to the storage array and/or to the application program's memory. The application program can then access the storage device without the operating system's intervention and the storage device will check whether the application has permission to access the data. As a result, in most cases, neither the operating system nor the file system needs to be invoked, and since both of them increase the amount of time required to access the data in the file system, considerable performance improvements are possible.

According to a first embodiment of the present invention, a method of accessing memory comprises allocating a channel for a process to access data in a memory array, and issuing a system call to gain access to the data in the memory array via the allocated channel. The method further comprises installing a permission record of a file system extent associated with the data, and receiving a command indicative of an operation to be performed by the process. Upon determining that the channel has permission to access a location associated with the data, the operation is performed, and completion of the command is signaled.

According to a second embodiment of the present invention, a computer program product is embodied on a computer-readable non-transitory medium and comprises computer code for allocating a channel for a process to access data in a memory array. The computer program product also comprises computer code for issuing a system call to gain access to the data in the memory array via the allocated channel, and computer code for installing a permission record of a file system extent associated with the data. Further still, the computer program product comprises computer code for receiving a command indicative of an operation to be performed by the process, and computer code for, upon determining that the channel has permission to access a location associated with the data, performing the operation, and signaling completion of the command.

According to a third embodiment of the present invention, system comprises a memory device and a user space driver operatively connected to the memory device and configured to: allocate a channel for a process to access data in the memory device; and issue a system call to gain access to the data in the memory device via the allocated channel, wherein the system call installs a permission record of a file system extent associated with the data. The system further comprises a memory mapped control register associated with the allocated channel upon which a command word is written to initiate a command, the command being indicative of an operation to be performed by the process. The memory device is configured to determine whether the channel has permission to access a location associated with data on the memory device, and upon a determination that the channel has permission to access a location associated with the data, performs the operation, and signals completion of the command.

BRIEF DESCRIPTION OF THE DRAWINGS

For a more complete understanding of example embodiments of the present invention, reference is now made to the following descriptions taken in connection with the accompanying drawings in which:

FIG. 4 is graph illustrating a comparison of permission table contention statistics in accordance with various embodiments;

FIGS. 5a and 5b are graphs illustrating comparisons of completion strategies utilized in various embodiments and resulting bandwidth measurements;

FIG. 6 is a graph illustrating write access latency comparisons between the improved SSD in accordance with various embodiments and a baseline SSD, both with and without the file system;

FIGS. 7a and 7b are graphs illustrating file system overhead bandwidth comparisons between the improved SSD in accordance with various embodiments and a baseline SSD, both with and without the file system;

DETAILED DESCRIPTION

Figure 1:
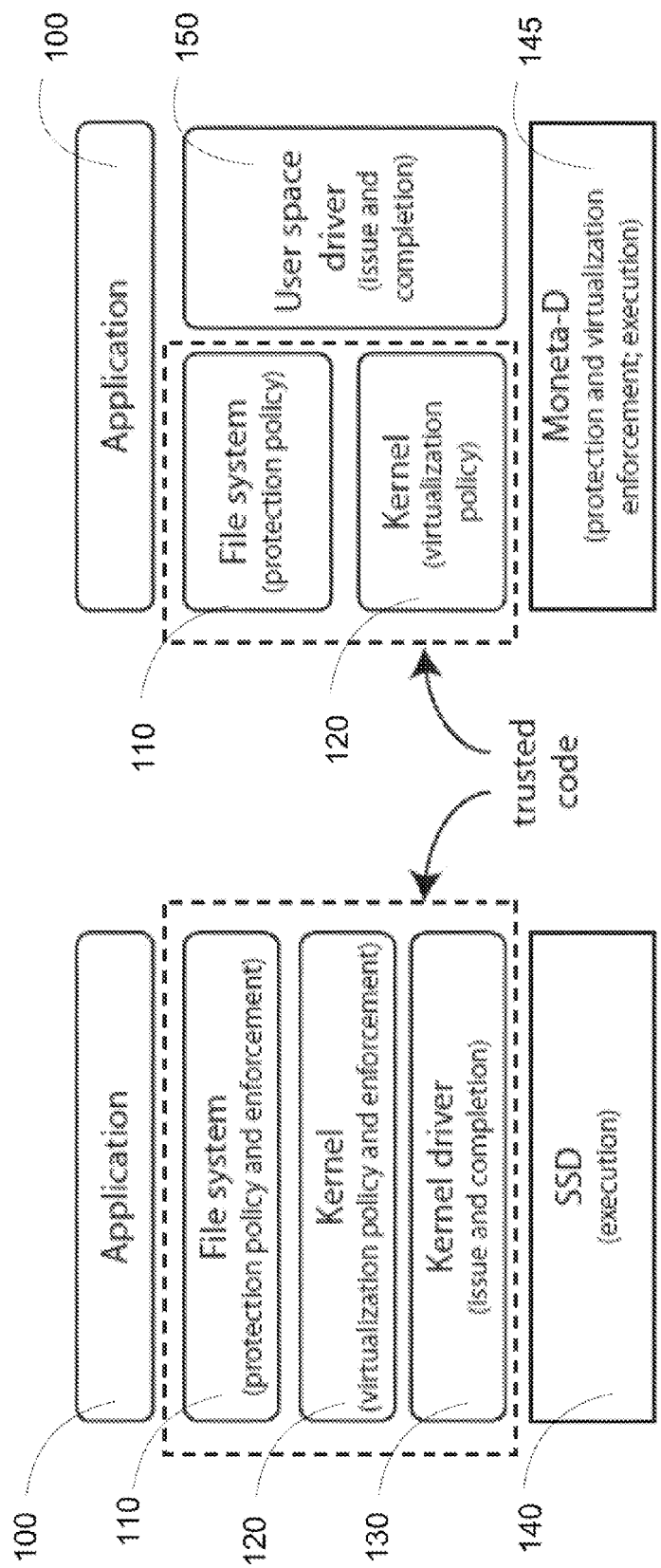
FIG. 1a illustrates a system stack for a conventional storage system.
FIG. 1b illustrates a system stack revising the system stack for the conventional storage system of FIG. 1a in accordance with various embodiments.

Solid-state drives are becoming very common in computer systems and are, in many cases, replacing hard drives in storage applications. SSDs are estimated to become at $10 Billion market. Solid state drives are fast enough that operating system and file system overheads (which are critically important to organizing data in an SSD) can significantly impact performance. Such was not the case with hard disks because they are so slow.

Emerging fast non-volatile technologies such as phase change, spin-torque transfer, and memristor memories make it possible to build storage devices that are orders of magnitude faster than even the fastest flash-based SSDs. Again, these technologies will rewrite the rules governing how storage hardware and software interact to determine overall storage system performance. In particular, software overheads that used to contribute marginally to latency (because storage hardware was slow) will potentially squander the performance that these new memories can provide.

In accordance with various embodiments, a next-generation, high-performance storage hardware and software architecture is provided that removes the aforementioned overheads and enables improved performance of almost any SSD (e.g., up to 6 times better performance). In particular, SSDs improved with the architecture contemplated and disclosed herein nearly eliminate two of the aforementioned costs, i.e., entering the kernel, and performing file system permission checks. This architecture in accordance with various embodiments provides a private, virtualized interface for each process and moves file system protection checks into the hardware. As a result, applications can access file data without operating system intervention, eliminating OS and file system costs entirely for most accesses.

In accordance with various embodiments, such a system provides for fast permission checks in hardware, as well as an approach for delivering interrupts to user space. Small, easily portable modifications to the file system enable moving protection checking to hardware. Changes in a device's operating system driver manage the new virtualized interface.

Evaluation of the contemplated system using a suite of microbenchmarks and database workloads shows that the new virtualized interface improves latency and bandwidth for 4 KB writes by 60% and 7.2×, respectively, online transaction processing (OLTP) database transaction throughput by up to 2.0×, and Berkeley-DB throughput by up to 5.7×. Using a streamlined asynchronous file IO interface enables an additional 5.5× increase in throughput with 1 thread and 22.8× increase in efficiency for 512 Byte transfers.

It should be noted that various embodiments are applicable to data storage devices that traditionally would be managed by a file system. These include hard drives, solid-state disks, RAID arrays, and network-attached storage systems. Moreover, the architecture described herein may be applied to other high-speed peripherals beyond just data storage devices. For purposes of describing various embodiments herein, the improved SSD may be described in the context of a Moneta storage array, and may be referred to as "Moneta Direct" or "Moneta-D." Thus, the terms Moneta-D and improved SSD may be used interchangeably herein.

To the above, extensions to Moneta are disclosed herein that remove the aforementioned costs by transparently bypassing the operating and file systems while preserving their management and protection functions. These extensions provide each process with a private interface, or channel, to Moneta. Unlike other systems that virtualize an entire device (e.g., a graphics card or network card), Moneta's channels are virtual interfaces to a single device. Each process uses its channel to access Moneta directly, without interacting with the operating system for most accesses. Hardware permission verification replaces permission checks in the operating system, preserving all of the protection guarantees the operating system normally provides.

To utilize channel-based IO, unmodified applications link with an untrusted user space driver library that intercepts IO system calls and performs the operations directly. The library works with a trusted driver and a slightly modified file system to extract file protection information and install it in Moneta. The library presents a standard portable operating system interface (POSIX).

An improved SSD (e.g., Moneta-D) in accordance with various embodiments has unique features that eliminate file system overheads and restructure the operating system storage stack to efficiently support direct, user space access to fast non-volatile storage arrays. Such an improved SSD removes trusted code and the associated overheads from most accesses. Only requests that affect metadata need to enter the operating system. Additionally, the improved SSD provides a fast hardware mechanism for enforcing the operating and file system's data protection and allocation policy. In accordance with various embodiments, the improved SSD trades off between CPU overhead and performance by using different interrupt forwarding strategies depending on access size and application requirements. Furthermore, the improved SSD provides an asynchronous software interface, allowing applications to leverage its inherently asynchronous hardware interface to increase performance and CPU efficiency.

In designing the improved SSD, testing results showed that Moneta-D improves performance for simple database operations by between 2.6× and 5.7×. For full SQL server workloads, performance improves by between 1.1× and 2.0×. For file access benchmarks, results show that Moneta-D can reduce the latency for a 512 byte read operation by 64% (to 4.1μs) relative to the original Moneta design. The reduction in latency leads to a 14.8× increase in bandwidth for 512 byte requests in the presence of a file system, allowing the storage array to sustain up to 1.8 million 512 byte IO operations per second. With a single thread, the improved SSD's asynchronous IO interface improves performance by 5.5× for 4 KB accesses when compared to synchronous IO. Asynchronous IO also improves efficiency by up to 2.8× reducing CPU utilization and saving power.

In accordance with various embodiments, operating system and file system overheads from accesses to Moneta-D are removed, while maintaining the strong protection guarantees that these software layers provide. The resulting system is, therefore, scalable in that many applications may access the improved SSD concurrently without adversely affecting performance. Furthermore, it is not necessary to modify the applications to take advantage of the improved SSD.

FIGS. 1a and 1b illustrate the changes made to a conventional system's hardware and software components. FIG. 1a shows a system stack for a conventional storage system, including an application 100, a file system 110, a kernel 120, a kernel driver 130, and an SSD itself 140. That is, the kernel 120, controlled by the kernel driver 130 bridges an application 100 and the actual data processing performed by the hardware, in this case, the SSD 140. All interactions with the hardware occur via the operating system and file system 110. Together, the operating system and file system 110 set the policy for sharing the device (i.e., SSD 140) and protecting the data it contains. They also enforce that policy by performing checks on each access. Both the file system 110 and hardware driver run as trusted, privileged code, while the hardware just executes the IO requests it receives from the kernel 120.

FIG. 1b shows a revised organization of the system stack of FIG. 1a in accordance with various embodiments. The kernel 120 and the file system 110 remain responsible for making policy decisions that control access to data stored in the array, but the storage array hardware (i.e., the improved SSD/Moneta-D 145) enforces that policy. The hardware exposes a set of channels that provide a single process with access to storage. The kernel 120 manages these channels, assigns them to processes, and maintains protection information associated with each channel. Since the hardware enforces protection, there is no need for a privileged (kernel) driver, such as kernel driver 130 in FIG. 1a. Instead, applications 100 access their channels via an untrusted driver library (e.g., user space driver 150), avoiding system call overheads. Such an architecture can be the default mechanism for file access rather than a specialized interface for high-performance applications. To make it feasible for all applications running on a system to use the interface, the improved SSD 145 supports a large number of virtual channels.

A channel is a virtual interface to the storage array. Each channel provides all the facilities necessary for a process to access data in the array and for the kernel to restrict access to only files that the process has successfully opened.

A channel has two interfaces, a privileged interface for configuration by the kernel and an unprivileged/untrusted/user interface for application access. The privileged interface comprises a set of control registers that let the kernel manage the channel and install permission information. The unprivileged interface has three components: 1) a set of user registers that the user space driver library uses to access array data; 2) a set of tags that distinguish between outstanding requests on the channel; and 3) a direct memory access (DMA) buffer.

How a process and the kernel use their respective interfaces to initialize a channel, access data, and manage permission information is described below.

The user space driver library initializes a channel by opening the storage device's file in /dev/ and memory mapping ("mmap( )ing") several pages into its address space. It should be noted that in this context, the storage device file refers to a "special file" that is an interface for the device driver that appears in the file system as an "ordinary" file. Mapping these pages allocates a channel for the process and grants it access to the hardware and software interfaces. The first mapped page contains the user registers that the process will use to communicate directly with the hardware. The next pages provide communication with the kernel via shared memory. The remaining pages make up the channel's DMA buffer. Initially, the channel does not have permission to access any of the data in the improved SSD/Moneta-D.

To gain access to data in the improved SSD, the user space driver library issues a system call that takes a file descriptor and an offset in the file. The system call returns a description of the file system extent (i.e., the range of physical bytes in Moneta-D) containing that offset. The process uses this information to populate a user space table that maps file offsets onto physical extents. If the process does not have access to that data, the system call returns an error.

The system call also installs the permission record for the extent in Moneta-D for the process's channel. Moneta-D's permission record storage is finite, so installing one permission record may require evicting another. This also means that the process may issue a request for data that it should be able to access and have the request fail. In this case, the process re-issues the system call to re-install the permission record and retries the request.

Once the process has installed a permission record, it can start making requests. To initiate a command, the process writes a 64-bit command word to the channel's memory-mapped command register. A command encodes the operation to perform (i.e., read or write), the region in the DMA buffer to use, the physical location in the improved SSD to access, and a tag to differentiate between requests. After issuing the command, the thread waits for the command to complete.

When the improved SSD receives the command word, it checks the hardware permission table to determine whether the channel has permission to access the location. If it does, it performs the command and signals its completion.

Figure 2:
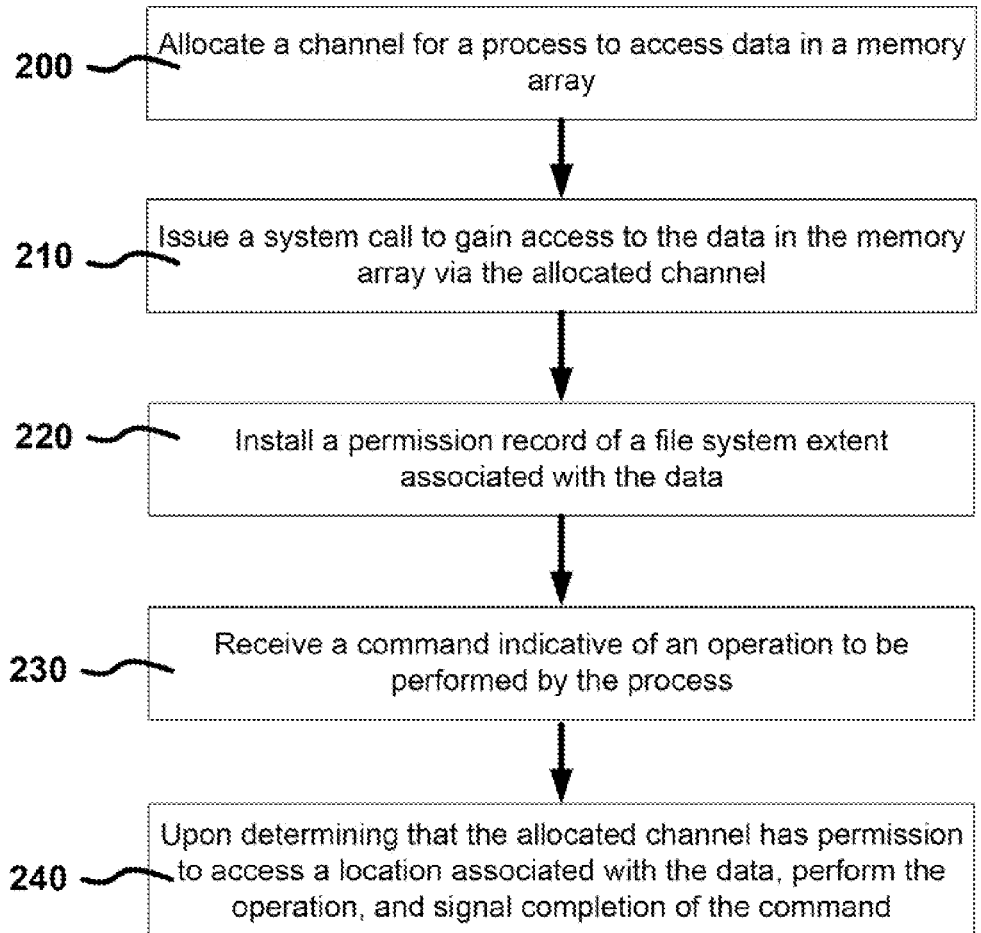
FIG. 2 is a flow chart illustrating exemplary processes performed for accessing data on an improved SSD in accordance with various embodiments.

FIG. 2 is a flow chart illustrating exemplary processes performed for accessing data on an improved SSD in accordance with various embodiments. At 200, a channel is allocated for a process to access data in a memory array. At 210, a system call is issued to gain access to the data in the memory array via the allocated channel. At 220, a permission record of a file system extent associated with the data is installed. At 230, a command indicative of an operation to be performed by the process may be received. At 240, upon determining that the channel has permission to access a location associated with the data, the operation is performed, and completion of the command is signaled.

As will be described in greater detail below, several schemes are contemplated for notifying the thread when a command completes.

The user space driver library for accessing the improved SSD performs the low-level driver functions including tag management, extent lookup, and command retry. The library transparently replaces the standard library calls for accessing files using LD_PRELOAD. Applications do not require any modification. When the program open( )s a file on the improved SSD, the library allocates a channel, if necessary, and then handles all future accesses to that file. The library forwards operations on all other files to the normal libc functions.

The library implements optimized pread( ) and pwrite( ) functions for accessing the improved SSD. A POSIX compatibility layer translates standard library calls into appropriate calls to these functions for all file operations (e.g. read( ), write( ), and seek( )). The layer also interposes on file descriptor manipulation functions (e.g. dup( ), dup2( ), and close( )) to track per-file descriptor state (e.g. like the file pointer's position) and aliasing relationships.

Other Non-POSIX interfaces are also possible. The hardware interface of the improved SSD is inherently asynchronous, so a high-performance asynchronous IO library is a natural fit. In addition, since the channel's DMA buffers reside in the process's address space, an optimized library could avoid copying data altogether.

The improved SSD, in accordance with various embodiments, changes the way applications interact with the file system to increase performance. These changes require minor modifications in the file system to support moving protection checking into hardware. They also introduce some challenges to maintaining existing functionality and consistency in the file system.

The only change required to the file system is the addition of a function to extract extent information. For example, implementing such file system changes in a sophisticated XFS journaling file system is relatively straightforward, where a single 30-line function accesses and translates file extent metadata into, e.g., Moneta-D's data structures. Adding similar support to other file systems is contemplated to be relatively easy as well.

All metadata updates and accesses in Moneta-D use conventional operating system interfaces. One challenge with this requirement stems from using the operating system to extend files while bypassing the buffer cache for all other file accesses. When extending files or filling file holes, XFS allocates and zeroes new blocks and writes them to the buffer cache. While the operating system commits these dirty blocks after a short period of time, Moneta-D will access the newly allocated blocks as soon as the system call returns—without updating the cached copies. This leads to a race between Moneta-D and the operating system that can potentially result in the cache's zeroed pages overwriting the data that the application wrote directly to Moneta-D. To avoid this problem, all blocks associated with a file are flushed whenever a file system extent lookup is performed. After the first access, this is usually a fast process for files in active use on Moneta-D. Flushing file data from the cache has the additional benefit of preventing applications that do not use Moneta-D's user space driver library from reading stale data from the cache.

Guaranteeing consistency while accessing files concurrently through Moneta-D and via the operating system remains a challenge. One solution is to detect files that applications have opened with both interfaces and force the application using the user space interface to switch to the operating system based interface. The library could do this without the application's knowledge. Alternatively, disabling the buffer cache for files residing on Moneta-D would also resolve the problem. Moneta-D's virtual interface also supports arbitrarily sized and aligned reads and writes, eliminating the need to support read-modify-write operations in software using DRAM.

The extensions to Moneta described herein involve issues regarding virtualization, fast protection and translation, and light-weight user space IO. The improved SSD in accordance with various embodiments different from the current state of the art in a variety of ways as will be discussed below.

The improved SSD in accordance with various embodiments differs from other efforts in virtualizing high-speed IO devices in that it provides a virtual interface to the device rather than merely providing logically separate virtual devices. That is, there is a single logical SSD (i.e., the improved SSD/Moneta-D) and a single file system to manage it, although many client applications can access the hardware directly. Creating multiple, independent virtual disks or multiple, independent virtual network interfaces for multiple virtual machines is a simpler problem because the virtual machine monitor can statically partition the device's resources across the virtual machines.

Previous work in high-speed networking explores the idea of virtualizing network interfaces, and allowing direct access to the interface from user space. DART, an asynchronous transfer method (ATM) Network Interface Controller (NIC) chip, implements network interface virtualization while also supporting offloading of some packet processing onto the network card for additional performance enhancements. However, the improved SSD disclosed herein further enables file systems protection checking in hardware.

Many projects have developed techniques to make whole-device virtualization more efficient, particularly for graphics cards and high-performance message-passing interconnects such as Infiniband. Virtualization techniques for graphical processing units (GPUs) provide several "rendering contexts" that correspond to an application window or virtual machine. For example, a user space driver library (e.g., OpenGL) requests a context from the kernel, and the kernel provides it a set of buffers and control registers it can use to transfer data to and from the card without OS involvement. Some Infiniband cards also provide per-application (or per-virtual machine) channels and split the interface into trusted and untrusted components. Other work has explored how to expose these channels directly to applications running inside virtual machines. However, neither of these applications requires the hardware to maintain fine-grain permission data as the improved SSD in accordance with various embodiments does.

The concurrent, direct network access (CDNA) model is also similar, but applies to virtual machines. In this model, the network card provides multiple independent sets of queues for network traffic, and the virtual machine manager (VMM) allows each virtual machine to access one of them directly. On an interrupt, the OS checks a register to determine which queues need servicing and forwards a virtual interrupt to the correct VMs.

Recent revisions of the PCie standard include IO virtualization (IOV) to support virtual machine monitors. PCie IOV allows a single PCie device to appear as several, independent virtual de-vices. Certain previous work involves a software-only approach to virtualizing devices that do not support virtualization, assuming the devices satisfies certain constraints. In both cases, the support is generic, and hence cannot provide the per-channel protection checks that the improved SSD disclosed herein requires. Additionally still, researchers have also found the PCie approach to be inflexible in the types of virtualized devices it can support.

Still other research has resulted in new IO architectures with virtualization as the driving concern. Some researchers have proposed a unified interface to several of the techniques described above, as well as extensions to improve flexibility. For example, one proposal involves a general approach to self-virtualizing IO devices that offload many aspects of virtualization to a processor core embedded in the IO device.

However, and as described above, various embodiments of the present application results in a system architecture that only offloads protection checks, and therefore, requires fewer hardware resources.

Efficiently initiating and completing IO requests from user space has received some attention in the high-speed networking and message-passing communities. In almost all cases, the VMs issue requests via stores to PIO registers, and the VMM is responsible for delivering virtual interrupts to the VMs. Two alternative approaches contemplated in accordance with various embodiments is described.

Prior work proposed ways of supporting user space IO and initiating DMA transfers from user space without kernel intervention. SHRIMP, for example, proposes user space DMA through simple load and store operations, but requires changes to the CPU and DMA engine to detect and initiate transfers. As previously indicated, and in contrast to this prior work, an improved SSD in accordance with various embodiments requires no change to the CPU or chipset.

Other prior work proposes architectural support for issuing multi-word PIO commands atomically. In effect, it implements a simple form of bounded transactional memory. The same work also suggests adding a TLB to the PCie controller to allow the process to specify DMA targets using virtual addresses. The PCie IOV extensions mentioned previously provide similar functions. The combination of multi-word atomic PIO writes and the DMA TLB would eliminate the need for a dedicated DMA buffer and make zero-copy IO with an SSD in accordance with various embodiments possible.

The same work also proposes hardware support for delivering interrupts to user space. Such a device would populate a user space buffer with the results of the IO operation, and then transmit data to the CPU describing which process should receive the interrupt. The OS would then asynchronously execute a user-specified handler. Thus, an improved SSD in accordance with various embodiments benefits from this type of support as well.

More recently, researchers have proposed dedicating an entire core to polling IO device status and delivering notifications to virtual machines through memory. The driver for recent PCie-attached flash-based SSDs from Virident dedicates one processor core solely to interrupt handling.

There have also been papers arguing against user space. The arguments against user space IO claim that efficient kernel-level implementations can be as fast as user-level ones and that the kernel should be the global system resource controller. However, it has been found that user-level IO can provide significant benefit without significantly increasing complexity for application developers. That is, and in accordance with various embodiments, the kernel is maintained as the global policy controller, moving only policy enforcement to the hardware. Additionally, these works evaluated high latency, disk-based systems. As storage latencies decrease additional software overheads have significant impacts on performance, making such argument less valid.

As described previously, an improved SSD in accordance with various embodiments, removes file system latency by copying permission information into hardware and caching the physical layout of data in user space. Some earlier approaches to distributed, networked storage use similar ideas. For example, the latest version of the network file system (NFS) support the pNFS extension that prevents the main NFS server from becoming a bottleneck in cluster-based NFS installations. Under pNFS, an NFS server manages storage spread across multiple storage nodes. When a client requests access to a file, it receives a map that describes the layout of the data on the storage nodes. Further requests go directly to the storage nodes. NASD is similar in that a central server delegates access rights to clients. However, it uses intelligent drives rather than separate storage servers to provide clients with access to data. NASD uses cryptographic capabilities to grant clients access to specific data, since untrusted machines may reside on the same network.

Modern processors provide hardware support for translation and protection (the TLB) and for servicing TLB misses (the page table walker) in order to reduce both translation and miss costs. Supporting multiple file systems, many channels, and large files requires an SSD in accordance with various embodiments to take a different approach. An improved SSD such as that described herein, provides hardware support for protection only. Thus, translation occurs on a per-file basis (since "addresses" are file offsets), and hardware translation would require the SSD to track per-file state rather than per-channel state. The kernel is responsible for servicing misses to the protection table, allowing the hardware to be agnostic about how the file system stores permission and extent information.

Rather than addressing accesses to physical blocks in a storage device, object-based storage systems provide an interface that stores objects addressed by name. To support this, object-based storage provides a layer of abstraction mapping between object names and physical storage in the device. However, shifting these mappings/translations into the hardware has several drawbacks for a system such as the improved SSD. First, the file system would require significant alterations, breaking the generic support that the improved SSD currently enables. Second, performing the translations directly in hardware could limit the improved SSD's performance if the lookups take more than a few hundred nanoseconds. Finally, dedicated DRAM in the improved for storing lookup information might be better located in the host system where it could be repurposed for other uses when not needed for translations.

Changes to conventional SSD architecture (affecting both the SSD controller and the software that controls it), e.g., baseline Moneta hardware and software, to provide for virtual channels will be described. A baseline Moneta system implements a highly optimized SSD architecture targeting advanced non-volatile memories. The improved SSD in accordance with various embodiments, e.g., Moneta-D, introduces modifications that enable hardware and software to work together to virtualize the control registers and tags, efficiently manage permission information, and deliver IO completions (e.g., forward interrupts) to user space.

Figure 3:
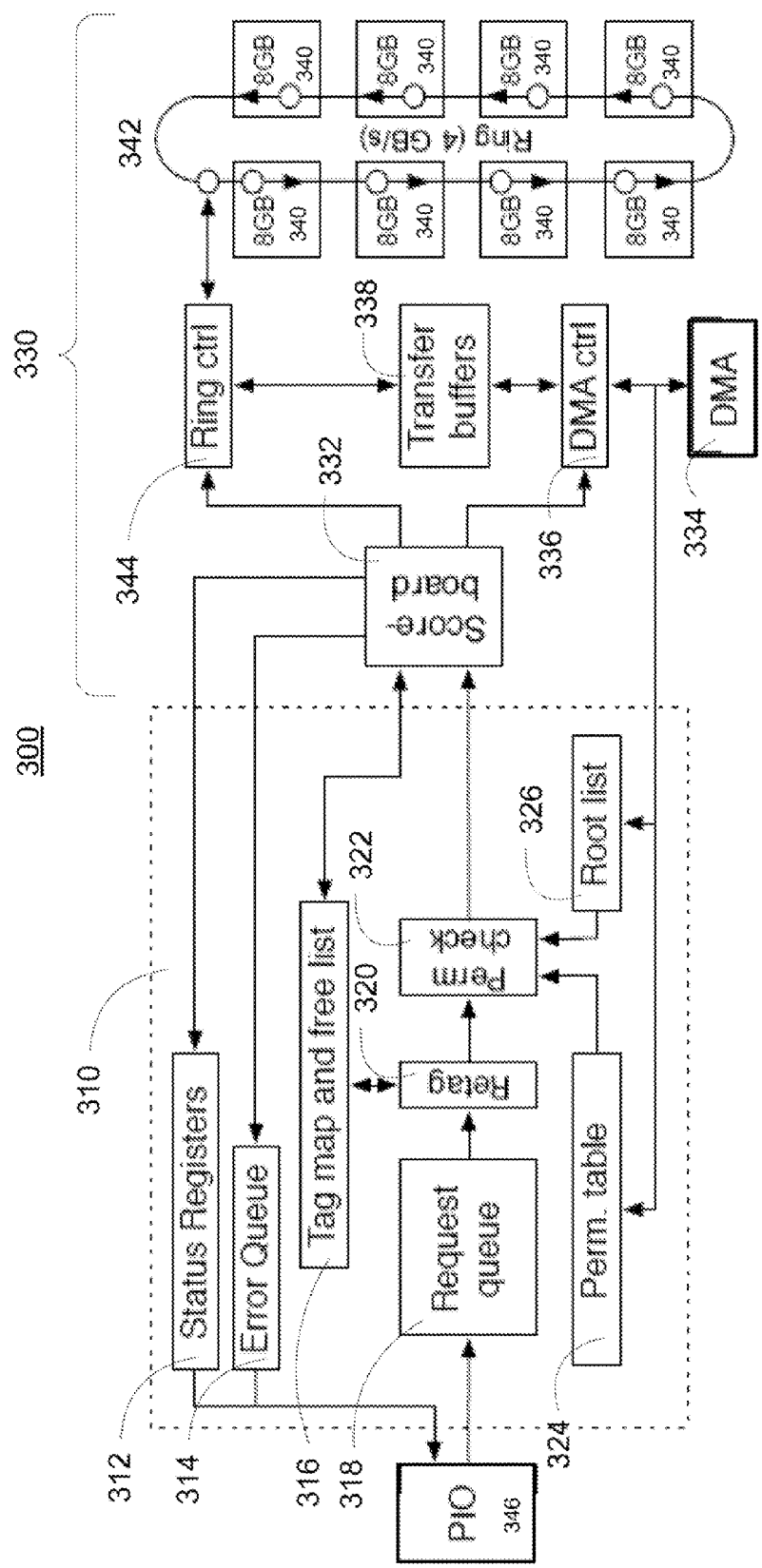
FIG. 3 illustrates an exemplary controller architecture in accordance with various embodiments.

FIG. 3 illustrates an exemplary controller architecture 300 in accordance with various embodiments. Components located within the dashed box 310 provide support for virtualization/virtual channels. These components may include, but are necessarily limited to, status registers 312, an error queue module 314, a tag map and free list module 316, request queue module 318, a retag module 320, a permissions check module 322, a permissions table 324, and a root list module 326. The remaining components 330 located at the right side of the controller architecture 300 (outside the dashed box) indicate the architecture of a baseline array that execute storage access commands, including a request scoreboard 332, a DMA module 334 and DMA controller 336, and a transfer buffer module 338. It spreads 64 GB of storage across eight memory controllers 240 connected via a high-bandwidth ring 242 controlled by a ring controller 344. An 8-lane PCIe 1.1 interface 346 provides a 2 GB/s full-duplex connection (4 GB/s total) to the host system. The baseline design supports 64 concurrent, outstanding requests with unique tags identifying each, and runs at 250 MHz on a BEE3 FPGA prototyping system.

The baseline SSD (e.g., Moneta) array emulates advanced non-volatile memories using DRAM and modified memory controllers that insert delays to model longer read and write times. Phase change memory (PCM) is modeled herein, and uses latencies (48 ns and 150 ns for array reads and writes, respectively). The array uses start-gap wear leveling to distribute wear across the PCM and maximize lifetime.

The baseline SSD design further includes extensive hardware and software optimizations to reduce software latency (e.g., by bypassing the Linux IO scheduler and removing unnecessary context switches), and maximize concurrency (e.g., by removing all locks in the driver). These changes reduce latency by 62% compared to the standard Linux IO stack, but system call and file system overheads still account for 65% of the remaining software overheads.

This baseline design implements a single channel that the operating system alone may access, and is provides a set of configuration and command registers, supports 64 tags, and targets a single DMA buffer in the kernel's address space.

Software latencies required for managing permissions, tags, and user data all contribute to operation latency. DMA and copying values are for 512 byte accesses. Cells with single value have same latency for both read and write accesses. Table 1 shows the latency breakdown for 512 B reads and writes on an improved SSD. The hardware, DMA, and copy overheads are common across the baseline and the extensions described in accordance with various embodiments. These, combined with the file system, system call, and interrupt processing overheads bring the total request latency in the baseline to 4.14 and 5.09 µs for reads and writes, respectively.

TABLE 1

| Component | Latency R/W (µs) | |
| --- | --- | --- |
| | 1 extent | 1K extents |
| Hardware + DMA | 1.26/2.18 | |
| Copy | 0.17/0.13 | |
| SW Extent lookup | 0.12 | 0.23 |

TABLE 1-continued

| Component | | Latency R/W (µs) | |
| --- | --- | --- | --- |
| | | 1 extent | 1K extents |
| HW Permission check | | 0.06 | 0.13 |
| Soft miss handling | | 7.28 | 29.9 |
| Hard miss handling | | 14.7 | 38.1 |
| Permission update | | 3.23 | 3.26 |
| File System | Baseline | 4.21/4.64 | |
| | Moneta-D | 0.21/0.29 | |
| System call | Baseline | 3.90/3.96 | |
| | Moneta-D | 0.00/0.00 | |
| Completion | Baseline (interrupts) | 1.92/1.91 | |
| | OS forwarding | 2.71/2.36 | |
| | DMA | 2.32/2.68 | |
| | issue-sleep | 14.65/14.29 | |

Supporting virtual channels on the improved SSD requires replicating the control registers, tags, and DMA buffers mentioned above, while maintaining file coherency across multiple processes. Again, the dashed box 300 in FIG. 3 contains the components that implement virtual channels, and the components outside the dotted box are present in the baseline design and implement the improved SSD's core functionality. They do not require significant modification.

The interface for a channel comprises several memory-mapped hardware control registers and a shared memory segment. Together, these allow the kernel and the user space driver library to configure the channel, perform operations on it, and receive notifications when they complete.

There are three sets of registers that control the improved SSD in accordance with various embodiments. These sets of registers include: the per-channel private registers that the kernel uses to configure individual channels; the per-channel user registers that applications use; and the private global registers that control aspects of the entire device. Table 2 describes the registers and the shared memory segment. The kernel's global registers allow the kernel to manage the improved SSD's functions that apply to multiple channels, such as error reporting and channel status. The kernel per-channel registers let the kernel configure individual channels. The user per-channel registers allow the process to access the hardware. Finally, the kernel/user shared memory segment contains the channel's DMA buffer and data structures used to notify threads when operations complete.

TABLE 2

| | | R/W | | | |
| --- | --- | --- | --- | --- | --- |
| | Name | Kernel | User | HW | Description |
| Kernel global registers | CHANNELSTATUS | R | — | W | Read and clear channel status and error bits. |
| | ERRORQUEUE | R | — | W | Read and pop one error from the SSD error queue. |
| User per-channel registers | COMMAND | W | W | R | Issue a command to the device. |
| | TAGSTATUSREGISTER | R | R | W | Read and clear tag completion bits and error flag. |
| Per-channel kernel/user shared memory segments | TAGSTATUSTABLE | W | R/W | W | Tracks completion status of outstanding requests. |
| | COMPLETIONCOUNT | W | R | — | Count of completed requests on each channel. |
| | DMABUFFER | — | R/W | R/W | Pinned DMA buffer for data transfers. |

In the non-virtualized system, the control pages live at fixed physical addresses. In the virtualized system, the improved SSD exposes 1024 channels, each with a private set of control pages located at a unique physical address. Reading or writing to any of these pages will send a PIO request to the improved SSD, which uses the address bits to determine which channel the command targets. To give a process access to a particular channel, the kernel maps the pages for the channel into the process's address space. The unique mapping of physical pages to channels allows the improved SSD to reliably know which process issued a particular request and prevents processes from accessing channels other than their own.

The baseline design supports 64 concurrent, outstanding requests to maximize parallelism and performance. To maximize performance and concurrency, each channel needs its own set of tags. One option is to support 65,536 tags (64 tags for each of the 1024 channels) in hardware and statically partition them across the channels. In a custom ASIC implementation this might be possible, but in the field programmable gate arrays (FPGAs) utilized in accordance with various embodiments, maintaining a request scoreboard of that size is not feasible at, e.g., a 250 MHz clock frequency.

Instead, each channel is provided with 64 virtual tags that are dynamically mapped onto a set of 64 physical tags. The virtual tag number comprises the channel ID and the tag number encoded in the command word. The "retag" module shown in FIG. 2 assigns physical tags to requests by drawing physical tags from a hardware free tag list. If a physical tag is not available, the retag unit stalls until a request completes and releases its physical tag.

Each channel has a private 1 MB DMA buffer in system DRAM that the improved SSD uses as the source and destination for writes and reads. The target DMA address for a request depends on its tag with each tag corresponding to one 16 KB slice of the channel's DMA buffer. If the process issues a command on tag k, the DMA transfer will start at the kth slice. The access that uses the tag can be larger than 16 KB, but it is the software's responsibility to not issue requests that overlap in the buffer.

The improved SSD's user space driver library provides asynchronous versions of its pread( ) and pwrite( ) calls. The asynchronous software interface allows applications to take advantage of the inherently asynchronous hardware by overlapping storage accesses with computation. For example, double buffering allows a single thread to load a block of data at the same time as it processes a different block. Furthermore, the improved SSD's asynchronous calls return immediately after issuing the request to the hardware, and return an asynchronous IO state structure that identifies and tracks the request. The user can then continue executing computation while checking request completion state using a complete( ) function.

The hardware of the improved SSD, the user space driver library, and the operating system all work together to translate file-level accesses into hardware requests and to enforce permissions on those accesses. In such a system, the hardware is only responsible for enforcing permissions. Translations between file offsets and physical storage locations occur in the user space driver library. Below, the role of both components and how they interact with the operating system and file system is described in greater detail.

The improved SSD checks permissions on each request it receives after it translates virtual tags into physical tags (as illustrated in FIG. 2, where upon processing through the request queue, each request is retagged based upon the tag map and free physical tags as previously described). Since the check is on the critical path for every access, the checks can potentially limit the improved SSD's throughput. To maintain the improved SSD's current throughput of 1.8M IOPS, permissions checks preferably take no more than 500 ns.

The improved SSD must also cache a large amount of permission information in order to minimize the number of "misses" that will occur when the table overflows and the system must evict some entries. These hard permission misses require intervention from both the user space driver and the operating system to remedy, a process that can take tens of microseconds (e.g., as indicated in Table 1).

To minimize the number of permission entries it must store for a given set of files, the improved SSD keeps extent-based permission information for each channel and merges entries for adjacent extents. All the channels share a single permission table with 16,384 entries. To avoid the need to scan the array linearly and to allow channels to dynamically share the table, the improved SSD arranges the extent information for each channel as a balanced red-black binary tree, with each node referring to a range of physical blocks and the permission bits for that range. A table of root pointers holds the location of the tree's root for each channel. Using balanced trees keeps search times fast despite the potentially large size of the permission tree. For example, where a worst-case tree traversal time is 180 ns, in practice, the average latency is just 96 ns. With a linear scan, the worst-case time would exceed 65 μs.

To reduce hardware complexity, the operating system maintains the binary trees, and the hardware only performs look ups. The OS keeps a copy of the trees in system DRAM. When it needs to update the improved SSD's permission table, it performs the updates on its copy and records the sequence of changes it made in a buffer. The improved SSD then reads the changes via DMA, and then replaces the changed portions of the tree while pausing protection checking.

When the user space driver library receives a read or write request for a file on the improved SSD, it is responsible for translating the access address into a physical location in the improved SSD, as well as issuing requests to the hardware.

The library maintains a translation map for each file descriptor it has open. The map has one entry per file extent. To perform a translation, the library looks up the target file location in the map. If the request spans multiple extents, the library will generate multiple IO requests.

Additionally, the library populates the map on-demand. If a look up fails to find an extent for a file offset, what is referred to as a "soft permissions miss" has occurred. To service a soft miss, the library requests information for the extent containing the requested data from the operating system. The request returns the mapping information and propagates the extent's protection and physical location information to hardware.

Once translation is complete, the library issues the request to the improved SSD and waits for it to complete. If the request succeeds, the operation is complete. Permission record eviction, or an illegal request may cause the request to fail. In that case, the library reloads the permission record and tries again.

Permission management and checking add some overhead to accesses to the improved SSD, but they also remove the conventional system call and file system overheads that provide the same functions in conventional systems. Table 1 shows the latencies for each operation that the improved SSD hardware and software perform. To measure them, a microbenchmark was used that performs 512 byte random reads and writes to a channel with one permission record and another with 1000 records present. The microbenchmark selectively enables and disables different system components to measure their contribution to latency. In the common case, accesses to the improved SSD incur software overhead in the user space driver library for the file offset-to-extent lookup. This requires between 0.12 and 0.23 µs, depending on the number of extents. The hardware permission check time is smaller, e.g., between 60 ns and 130 ns.

The miss costs are significantly higher, where handling a soft miss requires between 4.1 µs and 26.8 µs to query the file system for the extent information and 3.2 µs to update the permission tree in hardware. In total, a soft miss increases latency for a 512 byte access by between 7.3 µs and 30 µs, depending on the number of extents in use. The hard miss adds another 7.7 µs of latency on average, because the user space driver library does not detect it until the initial request fails and reports an error.

In the best case, only one soft miss should occur per file extent. Whether hard misses are a problem depends on the number of processes actively using the improved SSD and the number of extents they are accessing. Since fragmented files will place more pressure on the permission table, the file system's approach to preventing fragmentation is important.

XFS uses aggressive optimizations to minimize the number of extents per file, but fragmentation can still be a problem. Fragmentation measured on a 767 GB XFS file system that holds a heavily-used Postgres database resulted on average, each file containing 21 extents, and 97% of files containing a single extent. However, several files on the file system contained thousands of extents, and one database table contained 23,396.

Two strategies are contemplated in accordance with various embodiments to deal with fragmentation. The first strategy in accordance with one aspect of the present invention is to allocate space in sparse files in 1 MB chunks. When the library detects a write to an unallocated section of a file, it allocates space by writing up to 1 MB of zeroed data to that location before performing the user's request. This helps for workloads that perform small writes in sparse files. The second strategy in accordance with another aspect is to merge contiguous extents in the hardware permission table. This helps in the surprising number of cases in which XFS allocates discontinuous portions of a file in adjacent physical locations.

FIG. 4 shows the benefits of merging permission entries in detail, i.e., aggregate throughput for a single process performing random 4 KB accesses to between 2048 and 32,768 extents. Two lines depict the workload running on Moneta-D with (Moneta-Merge) and without (Moneta-NoMerge) combining permission table entries. Moneta-Merge merges entries if they belong to the same channel, represent data from the same file, have the same permission bits set, and cover physically adjacent blocks. Moneta-NoMerge does not merge extents. Because extents describe only physical ranges of blocks, two physically, but not logically, contiguous extents can merge.

In Moneta-NoMerge while sufficient entries are available, throughput remains high. Once all 16K permission table entries are in use, throughput drops precipitously as the hard miss rate rises. For Moneta-Merge performance remains high even when the number of extents exceeds the permission table size by 2×, because many extents merge into a smaller number of entries.

Avoiding hard misses requires having a sufficient number of permission table entries available for the process accessing the improved SSD directly.

There are at least two ways to achieve this. The first way to ensure that a sufficient number of permission table entries are available is to increase the permission table size. In a custom ASIC implementation this is not difficult. The second way to ensure a sufficient number of permission tables entries are available is to detect over-subscription of the permission table and force some processes to use the conventional system call interface by evicting all their permission table entries, refusing to install new ones, and returning an error code informing the process of the change in policy.

Modern hardware provides no mechanism for delivering an interrupt directly to a process, so virtualizing this aspect of the interface efficiently is more complex. The improved SSD supports three approaches to notifying a process when a command completes that trade-off CPU efficiency and performance.

The first scheme for notifying a process of command completion, in accordance with one embodiment, uses a traditional kernel interrupt handler that notifies channels of request status through a shared memory page. In this approach, the improved SSD's driver receives the interrupt and reads the CHANNELSTATUS register to determine which channels have completed requests. The kernel increments the COMPLETIONCOUNT variable for each of those channels.

The user space driver library spins on COMPLETIONCOUNT and the TAGSTATUSTABLE entry for the request after issuing requests. Once the kernel increments the value, the user space driver library sees the change and reads the per-channel TAGSTATUSREGISTER from the improved SSD, which atomically clears the register on read. The library then updates the entries in its TAGSTATUSTABLE for the completed tags, signalling any threads waiting for those tags to complete their requests.

The second approach to command completion, in accordance with a second embodiment, bypasses the operating system entirely. Rather than raise an interrupt, the improved SSD uses DMA to write the request's result code (i.e., success or an error) directly to the tag's entry in the channel's TAGSTATUSTABLE register. Instead of spinning on both the channel's COMPLETIONCOUNT and the TAGSTATUSTABLE entries, the thread spins only on the TAGSTATUSTABLE entry.

The previously described techniques for notifying a process of command completion each require the issuing thread to spin. For large requests this is undesirable because the gains in latency that spinning provides are small compared to overall request latency, and the spinning thread occupies a CPU, preventing it from doing useful work.

To avoid spinning, the issue-sleep technique, in accordance with a third embodiment, issues a request to the hardware and then asks the OS to put it to sleep until the command completes. When an interrupt arrives, the OS restarts the thread and returns the result code for the operation. This approach incurs the system call overhead, but avoids the file system overhead because permission checks still occur in hardware.

It is possible to combine the issue-sleep on the same channel with DMA completions, since the latter does not require interrupts. This allows the user library to trade-off between completion speed and CPU utilization. A bit in the command word that initiates a request tells the improved SSD which completion technique to use, as will be described in greater detail below.

Moving permission checks into hardware and virtualizing a standard SSD (e.g., Moneta) interface complicates the process of reporting errors. The improved SSD uses different mechanisms to report errors depending on which completion technique the request is using.

For interrupt forwarding and issue-sleep, the hardware enqueues the type of error along with its virtual tag number and channel ID in a hardware error queue. It then sets the error bit in the CHANNELSTATUS register and raises an interrupt.

The kernel detects the error by reading the CHANNEL-STATUS register. If the error bit is set, it extracts the error details from the queue by reading repeatedly from the ERRORQUEUE register. Each read dequeues an entry from the error queue. For interrupt forwarding, the kernel copies the error codes into the TAGSTATUSREGISTER registers for the affected channels. For issue-sleep completion, it returns the error when it wakes up the sleeping thread. The kernel reads from the ERRORQUEUE register until it returns zero.

For DMA completion, the hardware writes the result code for the operation directly into the TAGSTATUSTABLE register when the operation completes. No interrupt is needed.

The four completion methods for notifying a process of command completion (interrupts, OS forwarding, DMA, and issue-sleep) indicated in Table 1 reflect the measured latency of each of the strategies described above, in addition to the interrupt processing overhead for the baseline Moneta design. Interrupt forwarding and DMA completion all have similar latencies, i.e., between 2.5 and 2.7 µs. Issue-sleep takes over 14 µs, but for large requests, where issue-sleep is most useful, latency is less important.

FIGS. 5a and 5b illustrate the comparative performance of the three completion techniques described herein. The data are for 32 threads performing random accesses of the size given on the horizontal axis. Half (16) of the accesses are reads and the other half (16) are writes. FIG. 5a shows measured aggregate throughput as maximum sustained bandwidth, and shows that DMA completion outperforms the other schemes by between 21% and 171% for accesses up to 8 KB. Issue-sleep performs poorly for small accesses, but for larger accesses its performance is similar to interrupt forwarding. It should be noted that for the purposes of describing various embodiments from here forward, DMA completion is utilized.

FIG. 5b measures efficiency in terms of GB/s of bandwidth per CPU. The two spinning-based techniques fare poorly for large requests. Issue-sleep does much better and can deliver up to 7× more bandwidth per CPU. The drop in issue-sleep performance for requests over 128 KB is an artifact of contention for tags in the microbenchmark, where threads spin while waiting for a tag to become available and yield the processor between each check. Because the microbenchmark does not do any useful work, the kernel immediately reschedules the same thread. In a real application, another thread would run instead, reducing the impact of the spinning thread.

The data shows that correct choice of completion strategy depends on both the access pattern and what the application is optimizing for. If the application is CPU-intensive, issue-sleep is the preferred choice for accesses of 4 KB or larger because it is more CPU-efficient. For small requests or IO-intensive workloads, the application should use DMA completion.

The improved SSD's virtualized interface reduces both file and operating system overhead, but it also introduces new sources of potential latency as described previously. However, the overall impact of these changes is quantified below on the improved SSD's performance using an IO microbenchmark and several database applications.

FIG. 6 shows how end-to-end single thread access latency varies over a range of write request sizes from 512 B to 32 KB on the baseline Moneta design and the improved SSD, i.e., Moneta-D. Read latencies are similar. The graph shows data for accesses running with 1000 permission table entries installed. Moneta-D extends the baseline Moneta's performance by a wide margin. On basic IO performance tests, baseline Moneta performs many times faster than state-of-the-art flash-based SSDs, sustaining 1.1M 512-byte IOPS and a bandwidth of 2.8 GB/s on 4 KB or larger transfers. Moneta also produces speedups of up to 8.7×, with a harmonic mean speedup of 2.1× on a range of file system, paging, and database workloads. The data in FIG. 6 shows that Moneta-D effectively eliminates most file system and operating system overheads from requests of all sizes. The raw hardware can complete a 4 KB read or write operation in 8.2 µs. Additionally, system call overhead adds 5.5 µs and the XFS file system contributes 5 µs, on average, for a total of 18.8 µs. Assuming the access hits in the permission table, the virtualized design of the improved SSD eliminates the OS and file system components completely, reducing latency by 60%. Reducing software overheads for small (e.g., 512 byte) requests is especially beneficial because as request size decreases, hardware latency decreases and software latency remains constant.

Because removing the operating and file systems from common case accesses reduces software overhead per-IO operation, it also increases throughput, especially for small accesses. FIGS. 7a and 7b compare the bandwidth for Moneta-D and baseline Moneta with and without the file system. For writes, the impact of virtualization is large: Adding a file system reduces baseline performance by up to 13×, but adding a file system to the virtualized version has almost no effect. Moneta-D eliminates the gap for reads as well, although the impact of the file system on the baseline is smaller (i.e., at most 34%).

Reducing software overheads also increases the number of IO operations the system can complete per second, because the system must do less work for each operation. For small write accesses, throughput improves by 26×, and Moneta-D sustains 1.8 M 512 byte IO operations per second. In other words, giving applications direct access to the hardware nearly eliminates the performance penalty of using a file system.

Table 3 describes the workloads used to evaluate the application level performance of Moneta-D compared to the baseline Moneta design. The first two workloads are simple database applications that perform random single-value updates to a large key-value store in Berkeley-DB, backed either by a B+tree or a hash table. The six MySQL and PGSQL workloads consists of full OLTP database servers that aggressively optimize storage accesses and have strong consistency requirements that necessitate fast writeback to storage. They run a variety of OLTP operations including read-only lookups, single-value increments, and complex transactions with multiple lookups and updates.

TABLE 3

| Name | Data | Description |
| --- | --- | --- |
| Berkeley-DB Btree | 45 GB | Transactional updates to a B+tree key/value store |
| Berkeley-DB Hash | 41 GB | Transactional updates to a hash table key/value store |
| MySQL-Simple | 46 GB | Single value random select queries on MySQL database |

TABLE 3-continued

| Name | Data | Description |
| --- | --- | --- |
| MySQL-Update | 46 GB | Single value random update queries on MySQL database |
| MySQL-Complex | 46 GB | Mix of read/write queries in transactions on MySQL database |
| PGSQL-Simple | 55 GB | Single value random select queries on Postgres database |
| PGSQL-Update | 55 GB | Single value random update queries on Postgres database |
| PGSQL-Complex | 55 GB | Mix of read/write queries in transactions on Postgres database |

Figure 8:
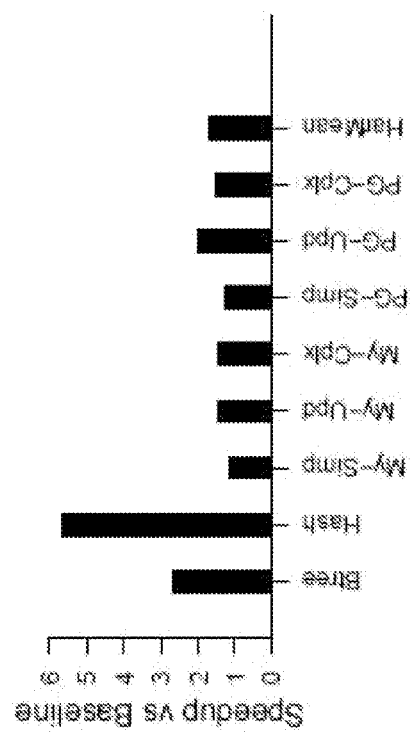
FIG. 8 is an illustration of workload performance as a result of utilizing the improved SSD in accordance with various embodiments.

FIG. 8 shows the performance results for baseline Moneta and the Moneta-D systems for all of test workloads. Moneta-D speeds up the Berkeley-DB applications by between 2.6× and 5.7× in terms of operations/second. The difference in performance between these two workloads may be attributed to significantly higher data structure contention in the B+tree database implementation.

The larger database applications, MySQL and Postgres, see performance improvements from 1.1× to 2.0× under Moneta-D. The data shows that for these workloads, operations resulting in many writes benefit most from the improved SSD, with transaction throughput increases of between 1.4× to 2.0×. Read-only queries also see benefits but the gains are smaller, e.g., 1.1× to 1.3×. This is consistent with Moneta-D's smaller raw read request throughput increase.

Additionally, Postgres produces access patterns that do not interact ideally with the improved SSD, and that application level optimizations enable better performance. Postgres includes many small extensions to the files that contain its database tables. With Moneta-D, these file extensions each result in a soft miss. Since Postgres extends the file on almost all write accesses, these soft misses eliminate Moneta-D's performance gains. However, pre-allocating zeroed out data files before starting the database server enables Postgres to take full advantage of Moneta-D, and although Moneta-D requires no application level changes to function, large performance improvements result from additional optimizations at the application level, such as allocating large blocks in the file system rather than many small file extensions.

Figure 9B:
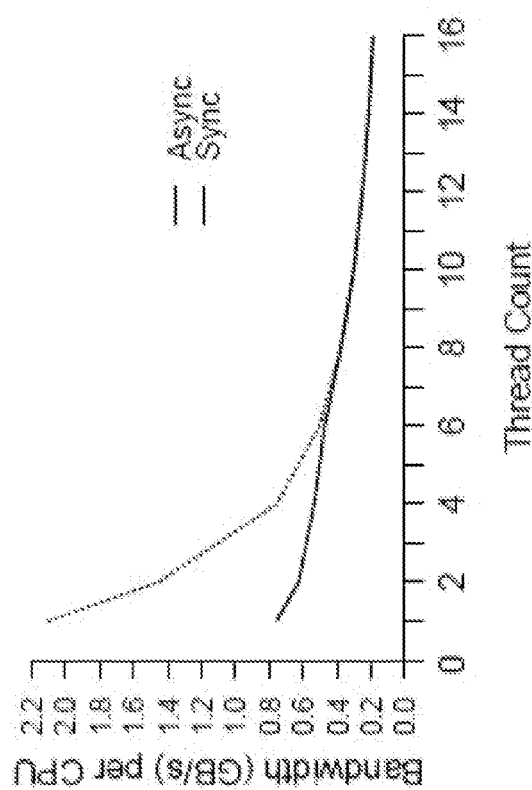
FIGS. 9a and 9b are graphs comparing synchronous and asynchronous interface performance with the improved SSD in accordance with various embodiments.
Figure 9A:
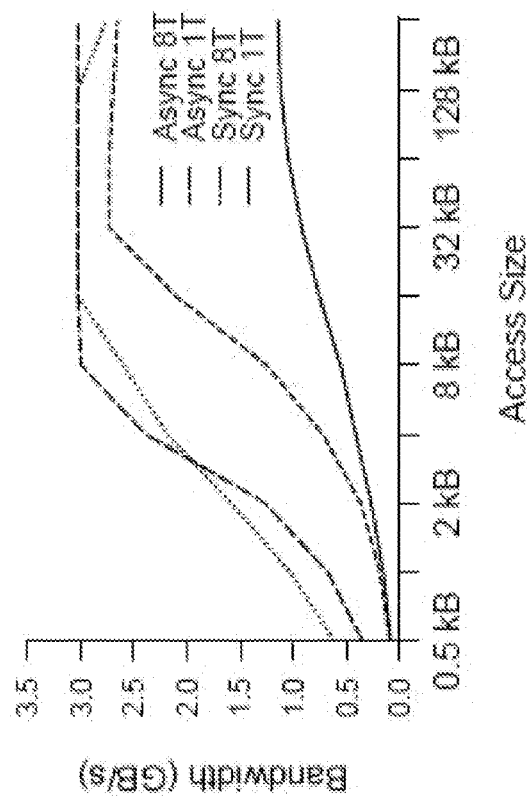

Providing an asynchronous IO interface to the improved SSD allows applications to take advantage of its inherently asynchronous hardware interface. FIGS. 9a and 9b compare the performance of the improved SSD with and without asynchronous IO. FIG. 9a shows sustained bandwidth for the synchronous and asynchronous interfaces with 1 and 8 threads. Asynchronous operations increase throughput by between 1.1× and 3.0× on access sizes of 512 bytes to 256 KB when using 1 thread. With 8 threads, asynchronous operations boost performance for requests of 4 KB or larger. Small request performance suffers from software overheads resulting from maintaining asynchronous request data structures and increased contention during tag allocation. That is, the improved SSD's asynchronous interface improves single threaded performance by up to 3.5× by eliminating time spent waiting for completions.

FIG. 9b shows the efficiency gains from using asynchronous requests on 16 KB accesses for varying numbers of threads. The data show that for one thread, asynchronous requests are 2.8× more efficient than synchronous requests with respect to the amount of bandwidth per CPU. As the number of threads increases, the asynchronous accesses slowly lose their efficiency advantage compared to synchronous accesses. As the number of threads increases, the per-thread performance decreases due to increased contention for hardware bandwidth and contention for tags. As thread count increases, asynchronous and synchronous IO performance converges on the same value.

The adaptive differential pulse-code modulation (ADPCM) codec from Mediabench can be modified to use the improved SSD's asynchronous IO interface, where a 100 MB file was decoded. Using Moneta-D's asynchronous IO interface resulted in an additional 1.4× speedup over the basic Moneta-D interface. By using three buffers, ADPCM can process one block while reading in another and writing out a third. ADPCM's performance demonstrates how overlapping data accesses with data processing enables significant gains. Moneta-D transforms an IO bound workload into a CPU bound one, shifting from 41% CPU usage on the baseline Moneta system to 99% CPU usage with the asynchronous interface.

As emerging non-volatile memory technologies shrink storage hardware latencies, hardware interfaces and system software must adapt or risk squandering the performance these memories offer. The improved SSD moves file system permission checks into hardware and uses an untrusted, user space driver to issue requests. These changes reduce latency for 4 KB write requests through the file system by up to 58% and increase throughput for the same requests by 7.6×. Reads are 60% faster. These increases in raw performance translate into large application level gains. Throughput for an OLTP database workload increased 2.0× and the Berkeley-DB based workloads described previously sped up by 5.7×. Asynchronous IO support provides 5.5× better 4 KB access throughput with 1 thread, and 2.8× better efficiency for 512 byte operations, resulting in a 1.7× throughput improvement for a streaming application.

While various embodiments of the present invention have been described above with regard to particular contexts/implementations, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein. Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A method, comprising:
    allocating a channel for a process to access data in a memory array, wherein the allocated channel bypasses an operating system;
    issuing a system call to gain access to the data in the memory array via the allocated channel;
    installing, in the memory array, a permission record of a file system extent associated with the data;
    receiving, via the allocated channel, a command indicative of an operation to be performed by the process and a location associated with the data;
    checking the permission record within hardware of the memory array to determine whether the allocated channel is permitted to access the location associated with the data; and
    upon determining that the allocated channel has permission to access the location associated with the data, performing the operation, and signaling completion of the command.

2. The method of claim 1, wherein the allocated channel comprises a virtual interface to the memory array.

3. The method of claim 2, wherein the virtual interface comprises:
    a privileged interface, the privileged interface comprising a set of control registers that allow a kernel to manage the allocated channel and install the permission record; and
    an unprivileged interface, the unprivileged interface comprising:
        a set of user registers used to access the data in the memory array;
        a set of tags distinguishing between outstanding requests on the allocated channel; and
        a direct memory access buffer.

4. The method of claim 1, wherein the allocation of the allocated channel comprises initializing a channel by opening a memory array file and memory mapping a plurality of pages into an address space of the memory array.

5. The method of claim 4, wherein the plurality of pages comprise a first mapped page including user registers to be utilized by the process to communicate with hardware of the memory array; a first plurality of mapped pages configured to provide communication with a kernel via shared memory; and a second plurality of mapped pages configured to make up a direct memory access of the allocated channel.

6. The method of claim 1, wherein the system call returns a description of the file system extent containing an offset of a file within which the data is contained.

7. The method of claim 6 further comprising, populating a user space table configured to map the offset of the file onto physical extents of the memory array.

8. The method of claim 1, wherein the command encodes:
the operation to be performed, the operation to be performed comprising one of a read operation and a write operation;
a region within a direct memory access buffer associated with the allocated channel; and
the location of the memory array for the accessing of the data.

9. The method of claim 1, wherein signaling of the completion is accomplished utilizing one of a forwarding interrupts mechanism, a direct memory access completion mechanism, and an issue-sleep mechanism.

10. A computer program product, embodied on a non-transitory computer-readable medium, comprising:
computer code for allocating a channel for a process to access data in a memory array wherein the allocated channel bypasses an operating system;
computer code for issuing a system call to gain access to the data in the memory array via the allocated channel;
computer code for installing, in the memory array, a permission record of a file system extent associated with the data;
computer code for receiving, via the allocated channel, a command indicative of an operation to be performed by the process and a location associated with the data;
computer code for checking the permission record within hardware of the memory array to determine whether the allocated channel is permitted to access the location associated with the data; and
computer code for, upon determining that the allocated channel has permission to access the location associated with the data, performing the operation, and signaling completion of the command.

11. The computer program product of claim 10, wherein the allocated channel comprises a virtual interface to the memory array.

12. The computer program product of claim 11, wherein the virtual interface comprises:
a privileged interface, the privileged interface comprising a set of control registers that allow a kernel to manage the allocated channel and install the permission record; and
an unprivileged interface, the unprivileged interface comprising:
a set of user registers used to access the data in the memory array;
a set of tags distinguishing between outstanding requests on the allocated channel; and
a direct memory access buffer.

13. The computer program product of claim 10, wherein the computer code for allocating the allocated channel further comprises computer code for initializing a channel by opening a memory array file and memory mapping a plurality of pages into an address space of the memory array.

14. The computer program product of claim 13, wherein the plurality of pages comprise a first mapped page including user registers to be utilized by the process to communicate with hardware of the memory array; a first plurality of mapped pages configured to provide communication with a kernel via shared memory; and a second plurality of mapped pages configured to make up a direct memory access of the allocated channel.

15. The computer program product of claim 10 further comprising, computer code for returning, in response to the issued system call, a description of the file system extent containing an offset of a file within which the data is contained.

16. The computer program product of claim 15 further comprising, computer code for populating a user space table configured to map the offset of the file onto physical extents of the memory array.

17. The computer program product of claim 10 further comprising, computer code for, encoding via the command:
the operation to be performed, the operation to be performed comprising one of a read operation and a write operation;
a region within a direct memory access buffer associated with the allocated channel; and
the location of the memory array for the accessing of the data.

18. The computer program product of claim 10, wherein the computer code for signaling of the completion further comprises computer code for utilizing one of a forwarding interrupts mechanism, a direct memory access completion mechanism, and an issue-sleep mechanism.

19. A system, comprising:
a memory device;
a user space driver operatively connected to the memory device and configured to:
allocate a channel for a process to access data in the memory device wherein the allocated channel bypasses an operating system; and
issue a system call to gain access to the data in the memory device via the allocated channel, wherein the system call installs, in the memory device, a permission record of a file system extent associated with the data; and
a memory mapped control register associated with the allocated channel upon which a command word is written to initiate a command via the allocated channel, the command being indicative of an operation to be performed by the process and a location associated with the data, wherein the memory device is configured to:
check the permission record within hardware of the memory device to determine whether the allocated channel has permission to access the location associated with the data on the memory device; and
upon a determination that the allocated channel has permission to access the location associated with the data, perform the operation, and signal completion of the command.

20. The system of claim 19, wherein the system further comprises:
the operating system and a file system, which in conjunction with each other, are configured to set protection policies associated with the memory device; and
a kernel configured to control virtualization policies associated with channel allocation.

21. The system of claim 20, wherein the memory device is further configured to enforce the protection policies.

22. The system of claim 19, wherein the system call further returns a description of the file system extent containing an offset of file within which the data is contained.

23. The system of claim 22, wherein the process populates a user space table configured to map the offset of the file onto physical extents of the memory array.

* * * * *